(12) United States Patent
Eto et al.

(10) Patent No.: US 11,565,688 B2
(45) Date of Patent: Jan. 31, 2023

(54) CONTROL DEVICE AND COMPUTER READABLE STORAGE MEDIUM

(71) Applicant: HONDA MOTOR CO., LTD., Tokyo (JP)

(72) Inventors: Masashi Eto, Saitama (JP); Koichiro Fujita, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 194 days.

(21) Appl. No.: 17/159,149

(22) Filed: Jan. 27, 2021

(65) Prior Publication Data

US 2021/0253079 A1 Aug. 19, 2021

(30) Foreign Application Priority Data

Feb. 13, 2020 (JP) .............................. JP2020-022620

(51) Int. Cl.
*B60W 20/12* (2016.01)
*B60W 10/06* (2006.01)
*B60W 10/08* (2006.01)

(52) U.S. Cl.
CPC ............ *B60W 20/12* (2016.01); *B60W 10/06* (2013.01); *B60W 10/08* (2013.01); *B60W 2510/244* (2013.01); *B60W 2510/246* (2013.01); *B60W 2555/60* (2020.02); *B60W 2556/45* (2020.02); *B60W 2710/06* (2013.01)

(58) Field of Classification Search
CPC ................ B60W 10/12; B60W 10/06; B60W 2510/244; B60W 2556/45; B60W 2710/06; B60W 10/08; B60W 20/13; B60W 2555/60; B60L 2240/545; B60L 2240/62; B60L 2240/80; B60L 2260/20; B60L 2260/52; B60L 5/12; B60L 58/27
See application file for complete search history.

(56) References Cited

U.S. PATENT DOCUMENTS

| | | | |
|---|---|---|---|
| 10,864,794 B2 | 12/2020 | Lee | |
| 2010/0324765 A1* | 12/2010 | Iida | B60L 58/25 701/22 |
| 2014/0180519 A1 | 6/2014 | Niimi | |
| 2017/0282895 A1* | 10/2017 | Morisaki | B60W 10/26 |
| 2020/0231023 A1* | 7/2020 | Sathasivam | H01M 10/633 |

(Continued)

FOREIGN PATENT DOCUMENTS

| | | | | |
|---|---|---|---|---|
| JP | 2006042596 A | * | 2/2006 | ............... B60K 6/48 |
| JP | 2015168390 A | | 9/2015 | |
| JP | 2019064566 A | | 4/2019 | |

(Continued)

*Primary Examiner* — Roger L Pang (57) ABSTRACT

A control device is provided, which includes: a destination determining unit configured to determine a destination of a hybrid vehicle that includes an engine, a motor and a battery and is able to supply waste heat from the engine to the battery; a arrival judging unit configured to judge whether the hybrid vehicle can arrive at the destination with a remaining capacity of the battery based on the remaining capacity and a temperature of the battery; and a vehicle control unit configured to control the hybrid vehicle to start the engine and supply the waste heat from the engine to the battery when the arrival judging unit judges that the hybrid vehicle cannot arrive at the destination.

20 Claims, 10 Drawing Sheets

(56) References Cited

U.S. PATENT DOCUMENTS

2020/0331452 A1\* 10/2020 Ferreira De Araujo ..................... B60W 20/13
2022/0055605 A1\* 2/2022 Lavertu .................. B60L 58/12

FOREIGN PATENT DOCUMENTS

| JP | 2019085094 A | 6/2019 |
|---|---|---|
| WO | 2013038492 A1 | 3/2013 |

\* cited by examiner

CONTROL DEVICE AND COMPUTER READABLE STORAGE MEDIUM

The contents of the following Japanese application are incorporated herein by reference:
NO. 2020-022620 filed in JP on Feb. 13, 2020.

BACKGROUND

1. Technical Field

The present invention relates to a control device and a computer readable storage medium.

2. Related Art

Patent document 1 describes a technique for warming a battery by exhaust heat from an internal combustion engine. Patent document 2 describes a technique for warming an engine or a battery according to a travelling mode to a destination. Patent document 3 describes a technique for enabling use of a heater in an EV travelling section by starting an engine before entering the EV travelling section and raising the temperature of coolant water. Patent document 4 describes a technique for performing an EV travelling until a predetermined time lapses after starting travelling.

PRIOR ART DOCUMENTS

Patent Documents

[Patent document 1] Japanese Patent Application Publication No. 2019-064566
[Patent document 2] WO 2013/038492
[Patent document 3] Japanese Patent Application Publication No. 2019-085094
[Patent document 4] Japanese Patent Application Publication No. 2015-168390

DESCRIPTION OF EXEMPLARY EMBODIMENTS

Hereinafter, the present invention will be described through the embodiments of the invention. However, the embodiments described below do not limit the invention according to the claims. In addition, not all combinations of features described in the embodiments are necessarily required for solutions of the invention.

Figure 1:
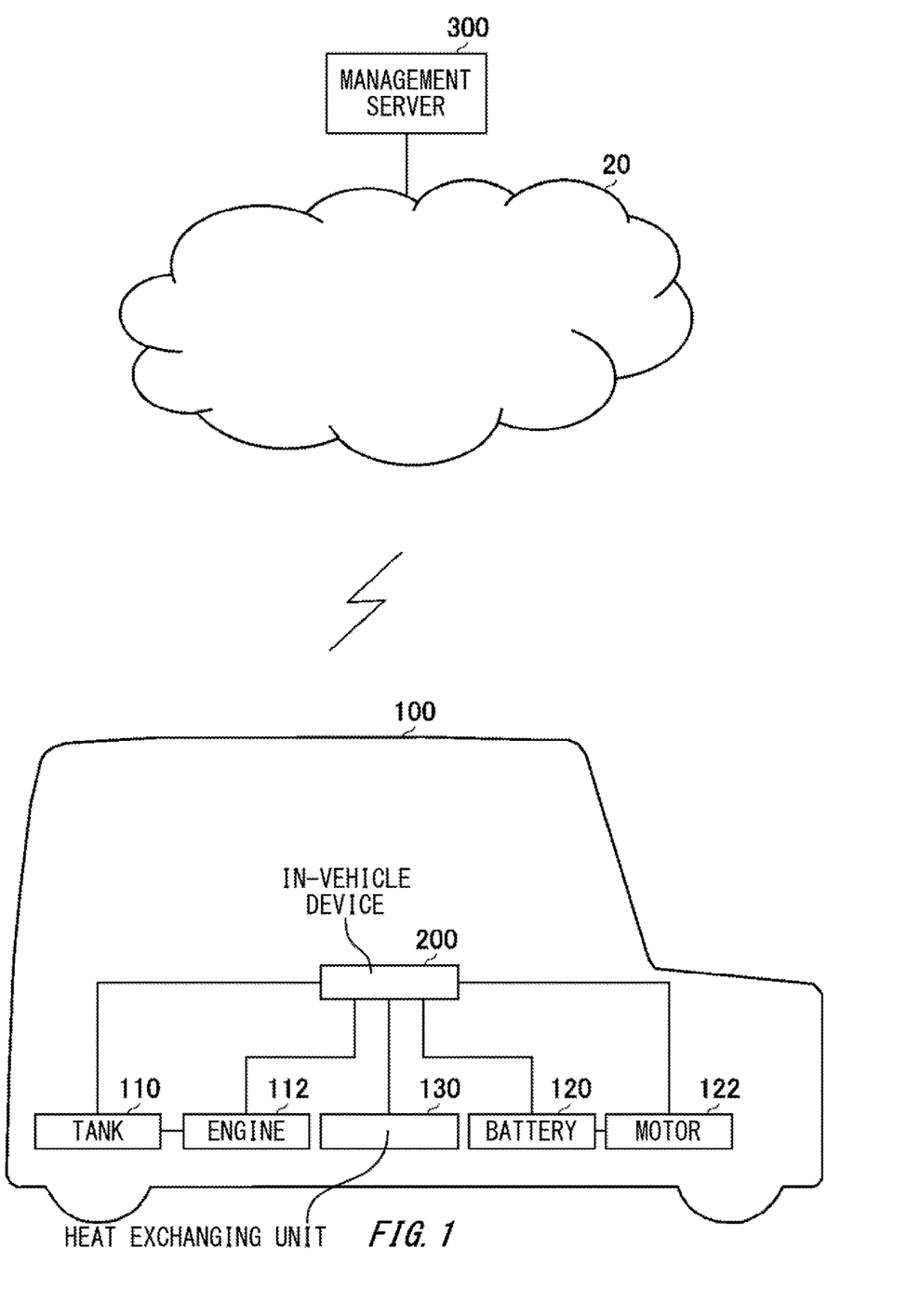
FIG. 1 schematically shows one example of a system 10.

FIG. 1 schematically shows one example of a system 10. The system 10 includes an in-vehicle device 200 and a management server 300. The system 10 may include a hybrid vehicle 100.

The in-vehicle device 200 is mounted in the hybrid vehicle 100. The hybrid vehicle 100 includes a tank 110, an engine 112, a battery 120, a motor 122, and a heat exchanging unit 130. The hybrid vehicle 100 can perform both of engine travelling in which the hybrid vehicle 100 uses the engine 112 and non-engine travelling in which the hybrid vehicle 100 does not use the engine 112.

In a case where the hybrid vehicle 100 is a parallel hybrid vehicle, the engine travelling may be a travelling method in which the hybrid vehicle 100 travels by operating the engine 112 and driving the motor 122 with electrical power generated by driving a generator with the engine 112. In principle, the engine travelling may be a travelling method in which electrical power of the battery 120 is not used. The engine travelling may be a travelling method in which a drive shaft is rotated by power of the engine 112. The engine travelling may be a travelling method in which the hybrid vehicle 100 travels by a combination of the power of the engine 112 and the power of the motor 122. The non-engine travelling may be a travelling method in which the hybrid vehicle 100 travels by driving the motor 122 with the electrical power of the battery 120 without operating the engine 112.

In a case where the hybrid vehicle 100 is a series hybrid vehicle, the engine travelling may be a travelling method in which the hybrid vehicle 100 travels by operating the engine 112 and driving the motor 122 with the electrical power generated by driving a generator with the engine 112. In principle, the engine travelling may be a travelling method in which electrical power of the battery 120 is not used. The non-engine travelling may be a travelling method in which the hybrid vehicle 100 travels by driving the motor 122 with the electrical power of the battery 120 without operating the engine 112.

In a case where the hybrid vehicle 100 is a series-parallel hybrid vehicle, the engine travelling may be a travelling method in which the hybrid vehicle 100 travels by operating the engine 112 and driving the motor 122 with the electrical power generated by driving a generator with the engine 112, a travelling method in which a drive shaft is rotated by power of the engine 112, or a travelling method in which the hybrid vehicle 100 travels by a combination of the power of the engine 112 and the power of the motor 122. The non-engine travelling may be a travelling method in which the hybrid vehicle 100 travels by driving the motor 122 with the electrical power of the battery 120 without operating the engine 112.

The heat exchanging unit 130 is configured to supply waste heat from the engine 112 to the battery 120. The heat exchanging unit 130 may supply the waste heat from the engine 112 to the battery 120 in any method. For example, the heat exchanging unit 130 is configured to control the supply of the waste heat from the engine 112 to the battery 120 by switching on/off of heat transfer between a coolant flow channel arranged so as to enable collection of the waste heat from the engine 112 and a coolant flow channel arranged so as to enable warming of the battery 120.

The in-vehicle device 200 is configured to control the hybrid vehicle 100. The in-vehicle device 200 may control the engine 112, the motor 122, and the heat exchanging unit 130. The in-vehicle device 200 may manage a remaining amount of fuel in the tank 110. The in-vehicle device 200 may manage a remaining capacity of the battery 120. The in-vehicle device 200 may manage a temperature of the battery 120.

The in-vehicle device 200 may receive various types of information from the management server 300 via a network 20. For example, the in-vehicle device 200 is configured to receive road information from the management server 300. The road information may include a congestion degree of a road. The road information may include a shape of the road. The shape of the road may include a grade of the road. The road information may include vehicle velocity information indicating an average vehicle velocity of the vehicle travelling on the road.

The network 20 may be any network. For example, the network 20 includes a mobile communication network such as the so-called 3G (3rd Generation), LTE (Long Term Evolution), 4G (4th Generation), and 5G (5th Generation). The network 20 may include the so-called WiFi (Wireless Fidelity) network. The network 20 may include the Internet.

The in-vehicle device 200 according to the present embodiment is configured to determine a destination of the hybrid vehicle 100 in which the in-vehicle device 200 is mounted (which may be described as the own vehicle), and judge whether the hybrid vehicle 100 can arrive at the destination with the remaining capacity of the battery 120 based on the remaining capacity and the temperature of the battery 120. That the hybrid vehicle 100 can arrive at the destination with the remaining capacity of the battery 120 may be that the hybrid vehicle 100 can arrive at the destination only by the non-engine travelling without performing the engine travelling.

The in-vehicle device 200 is configured to control the hybrid vehicle 100 to start the engine 112 and supply the waste heat from the engine 112 to the battery 120 when the in-vehicle device 200 judges that the hybrid vehicle 100 cannot arrive at the destination with the remaining capacity of the battery 120. The in-vehicle device 200 may be one example of a control device.

If the hybrid vehicle 100 can arrive at the destination only by the non-engine travelling, then it is economical to perform only the non-engine travelling because the hybrid vehicle 100 does not need to use the fuel in the tank 110. However, if the hybrid vehicle 100 cannot arrive at the destination only by the non-engine travelling, then the temperature of the battery 120 upon starting the non-engine travelling can be raised and the electricity consumption can be improved by causing the hybrid vehicle 100 to firstly start the engine 112, supply the waste heat from the engine 112 to the battery 120, and thereafter perform the non-engine travelling.

Note that the in-vehicle device 200 may cause the hybrid vehicle 100 to perform the engine travelling after the engine 112 is started. In addition, the in-vehicle device 200 may cause the hybrid vehicle 100 to execute heating of the cabin of the hybrid vehicle 100 by an air conditioner utilizing the engine 112 after starting the engine 112.

Figure 2:
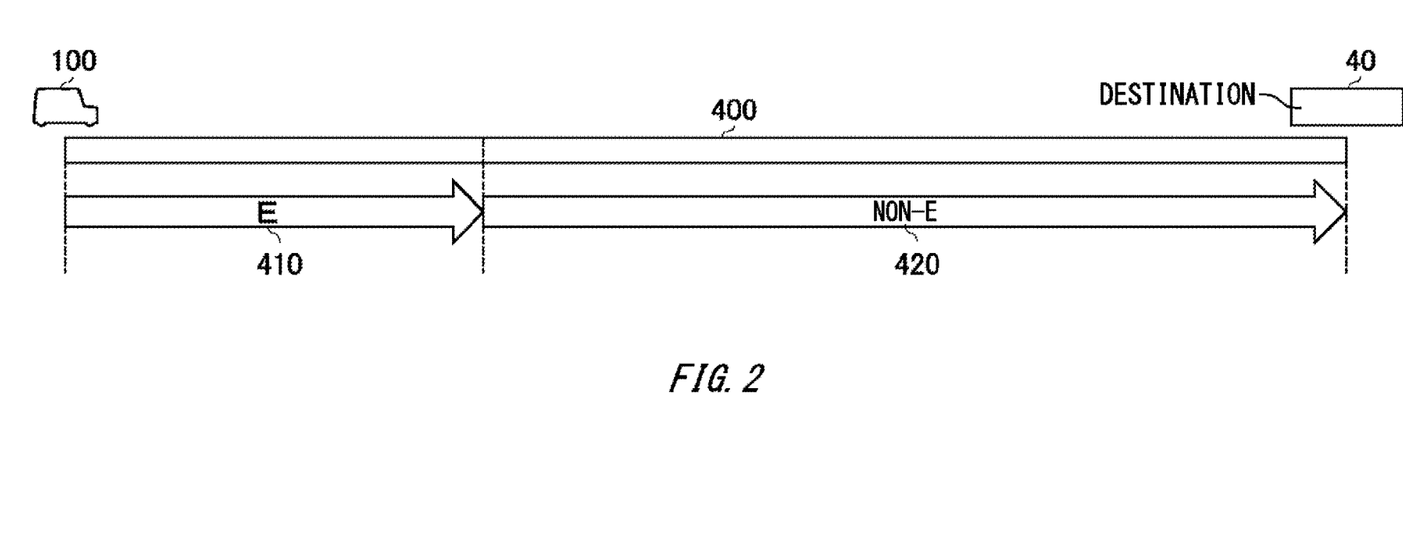
FIG. 2 is an illustration for explaining travelling control by an in-vehicle device 200.

FIG. 2 is an illustration for explaining travelling control by the in-vehicle device 200. The in-vehicle device 200 determines a scheduled travelling route 400 to the destination 40 when the destination 40 of the own vehicle is determined.

Then, the in-vehicle device 200 judges whether the hybrid vehicle 100 can arrive at the destination 40 with the remaining capacity of the battery 120. When the in-vehicle device 200 judges that the hybrid vehicle 100 can arrive at the destination 40, the in-vehicle device 200 may control the hybrid vehicle 100 to travel the scheduled travelling route 400 by the non-engine travelling.

In the example shown in FIG. 2, when the in-vehicle device 200 judges that the hybrid vehicle 100 cannot arrive at the destination 40 with the remaining capacity of the battery 120, the in-vehicle device 200 may determine an engine travelling section 410 and a non-engine travelling section 420 such that the engine travelling section 410 starts from the starting point of the hybrid vehicle 100 and the non-engine travelling section 420 starts after the engine travelling section 410. The in-vehicle device 200 controls the hybrid vehicle 100 to travel the engine travelling section 410 by the engine travelling and travel the non-engine travelling section 420 by the non-engine travelling.

If the hybrid vehicle 100 can arrive at the destination only by the non-engine travelling, then it is economical to perform only the non-engine travelling because the hybrid vehicle 100 does not need to use the fuel in the tank 110. Therefore, it is a common practice to control the hybrid vehicle 100 to perform the non-engine travelling from the starting point, and, when the remaining capacity of the battery 120 is depleted, switch to the engine travelling. However, when the temperature of the battery 120 is lowered, the charge and discharge characteristic of the battery 120 is deteriorated. For this reason, when the temperature of the battery 120 is lowered at the starting time point, the non-engine travelling from the starting point results in the hybrid vehicle 100 travelling in a state in which the electricity consumption is poor.

In contrast, in the example shown in FIG. 2, the in-vehicle device 200 control the hybrid vehicle 100 to start the engine 112 to perform the engine travelling before the non-engine travelling and supply the waste heat from the engine 112 to the battery 120, in a situation in which the hybrid vehicle 100 cannot arrive at the destination with the remaining capacity of the battery 120 and consequently will perform the engine travelling. Thus, the fuel consumption and the electricity consumption can be improved because the electric energy of the battery 120 can be used after raising the temperature of the battery 120 by the waste heat from the engine 112 and setting the battery 120 in a state in which the electric energy of the battery 120 can be efficiently taken out.

Figure 3:
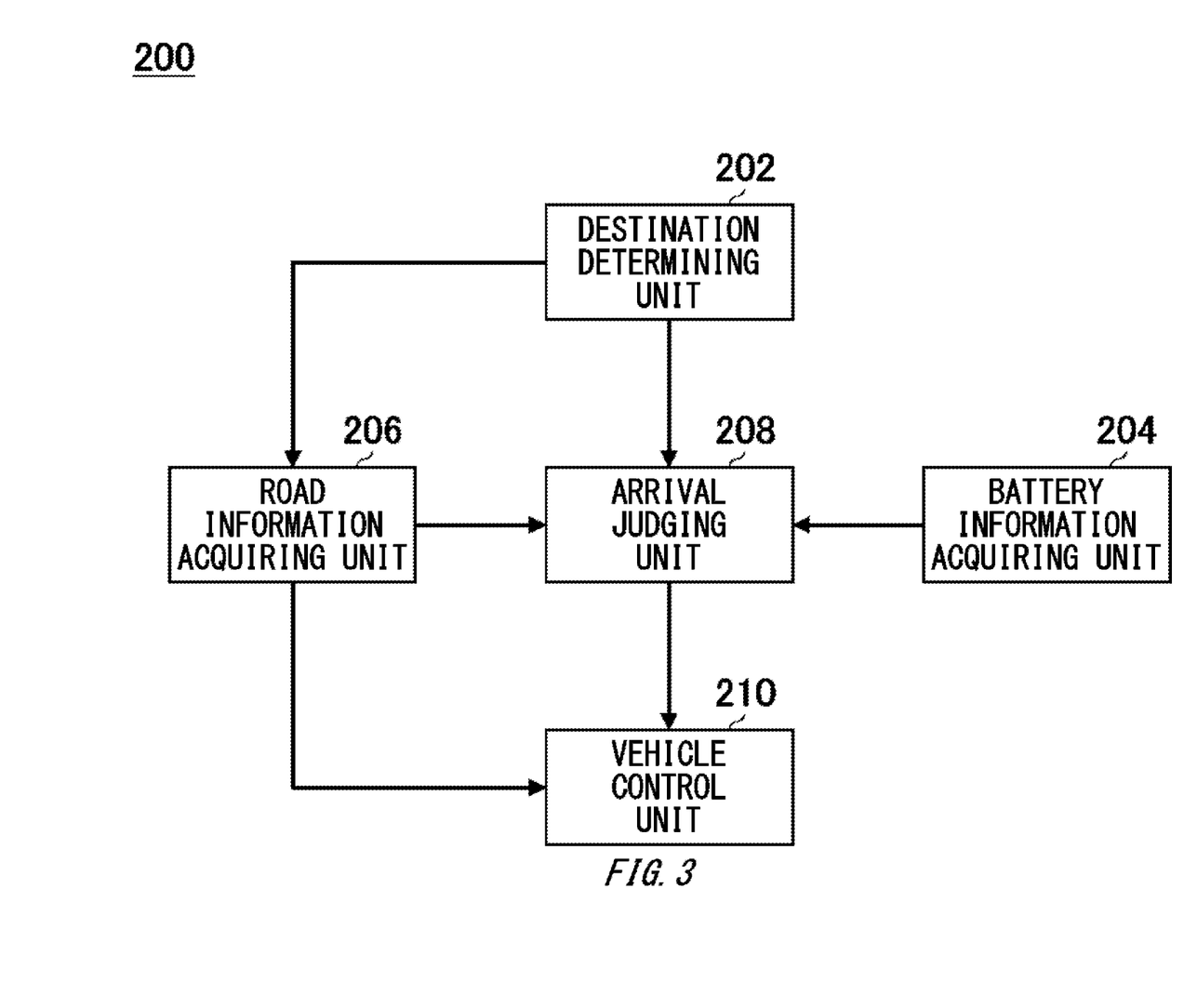
FIG. 3 schematically shows one example of a functional configuration of the in-vehicle device 200.

FIG. 3 schematically shows one example of a functional configuration of the in-vehicle device 200. The in-vehicle device 200 includes a destination determining unit 202, a battery information acquiring unit 204, a road information acquiring unit 206, an arrival judging unit 208, and a vehicle control unit 210.

The destination determining unit 202 is configured to determine a destination of the own vehicle. The destination determining unit 202 may determine the destination of the own vehicle by receiving a designation by an occupant of the own vehicle.

The battery information acquiring unit 204 is configured to acquire battery information from the battery 120. The battery information includes a remaining capacity and a temperature of the battery 120.

The road information acquiring unit 206 is configured to acquire road information of a route to the destination determined by the destination determining unit 202. The road information acquiring unit 206 may acquire road information of a plurality of routes to the destination. The road information acquiring unit 206 may inform the management server 300 about the plurality of routes, and receive road information of the plurality of routes from the management server 300. The road information acquiring unit 206 may acquire the road information of the plurality of routes from road information received in advance from the management server 300 and stored therein.

The arrival judging unit 208 is configured to determine a scheduled travelling route to the destination determined by the destination determining unit 202. The arrival judging unit 208 may determine the scheduled travelling route by a similar method to a determining method of an existing navigation system. The arrival judging unit 208 may determine the scheduled travelling route from a plurality of routes to the destination based on the road information acquired by the road information acquiring unit 206. The arrival judging unit 208 may determine a route designated by the occupant of the own vehicle among the plurality of routes to the destination as the scheduled travelling route.

The arrival judging unit 208 is configured to judge whether the own vehicle can arrive at the destination with the remaining capacity of the battery 120 based on the battery information acquired by the battery information acquiring unit 204 and the road information acquired by the road information acquiring unit 206. The arrival judging unit 208 may judge whether the own vehicle can arrive at the destination only by the non-engine travelling. For example, the arrival judging unit 208 may judge whether the own vehicle can arrive at the destination with the remaining capacity of the battery 120 by deriving a range cruisable only by the non-engine travelling from the battery information and the road information using a known deriving method and comparing the derived range with the travel distance to the destination.

The arrival judging unit 208 may predict a temperature change of the battery 120 when the own vehicle performs the non-engine travelling, and judge whether the own vehicle can arrive at the destination with the remaining capacity of the battery 120 further based on a prediction result. For example, the arrival judging unit 208 is configured to predict a charge and discharge characteristic of the battery 120 at each time point based on the temperature of the battery 120 at the starting time point and the predicted temperature change, and derive the range further based on a prediction result. By using the prediction result of the temperature change as described above, the judgement precision of judging whether the hybrid vehicle 100 can arrive at the destination with the remaining capacity of the battery 120 can be improved.

The vehicle control unit 210 is configured to control the own vehicle to start the engine 112 and supply the waste heat from the engine 112 to the battery 120 when the arrival judging unit 208 judges that the hybrid vehicle 100 cannot arrive at the destination. The vehicle control unit 210 may control the own vehicle to perform the engine travelling after starting the engine 112. The vehicle control unit 210 may cause the air conditioner utilizing the engine 112 to perform heating of the cabin of the own vehicle after starting the engine 112.

The vehicle control unit 210 may control the own vehicle to perform the engine travelling before the non-engine travelling and supply the waste heat from the engine 112 to the battery 120 when the arrival judging unit 208 judges that the own vehicle cannot arrive at the destination. This can raise the temperature of the battery 120 at the time point when the non-engine travelling is started and can improve the electricity consumption of the non-engine travelling.

For example, the vehicle control unit 210 is configured to determine the engine travelling section including a section of the engine travelling before the non-engine travelling and the non-engine travelling section within the scheduled travelling route when the arrival judging unit 208 judges that the own vehicle cannot arrive at the destination. The vehicle control unit 210 may control the own vehicle to travel the engine travelling section by the engine travelling and travel the non-engine travelling section by the non-engine travelling.

The vehicle control unit 210 may divide the scheduled travelling route into a plurality of sections, acquire vehicle velocity information in each section from the road information acquiring unit 206, and set a section to be the non-engine travelling section if the vehicle velocity information in the section is equal to or lower than a threshold. Preferentially assigning the non-engine travelling to a section with a lower average vehicle velocity when assigning the engine travelling section or the non-engine travelling section to each of the plurality of sections can contribute to improvement of the fuel consumption during travelling the scheduled travelling route.

For example, the vehicle control unit 210 is configured to determine the engine travelling section and the non-engine travelling section such that the engine travelling section starts from a starting point of the own vehicle in the scheduled travelling route. This can prevent the own vehicle to perform the non-engine travelling using the electrical power of the battery 120 in a state in which the temperature of the battery 120 is low, i.e. in a state in which the charge and discharge characteristic of the battery 120 is poor, and can improve the electricity consumption.

The vehicle control unit 210 may determine the engine travelling section and the non-engine travelling section by which the own vehicle can arrive at the destination only by the non-engine travelling after switching from the engine travelling to the non-engine travelling. The vehicle control unit 210 may determine the engine travelling section and the non-engine travelling section such that the engine travelling section is minimized to the extent that the own vehicle can arrive at the destination only by the non-engine travelling after switching from the engine travelling to the non-engine travelling. For example, the vehicle control unit 210 is configured to gradually extend a length of the engine travelling section within the scheduled travelling route, and determine the engine travelling section by which the own vehicle can travel the remaining section within the scheduled travelling route only by the non-engine travelling. This can cause the own vehicle to perform the non-engine travelling using the electrical power of the battery 120 after heating the battery 120 with the waste heat from the engine 112 by causing the own vehicle to perform the engine travelling before the non-engine travelling, and can also minimize the fuel consumption of the tank 110.

The vehicle control unit 210 may determine the engine travelling section and the non-engine travelling section by which the own vehicle performs the engine travelling until the temperature of the battery 120 becomes higher than a predetermined temperature by causing the own vehicle to perform the engine travelling and supply the waste heat from the engine 112 to the battery 120. The predetermined temperature may be arbitrarily settable and may be changeable.

The vehicle control unit 210 may determine a travelling time of the engine travelling to be performed before the non-engine travelling and control the hybrid vehicle to travel by the engine travelling during the travelling time, when the arrival judging unit 208 judges that the hybrid vehicle cannot arrive at the destination. For example, the vehicle control unit 210 is configured to determine the engine travelling time by which the hybrid vehicle can arrive at the destination only by the non-engine travelling after switching from the engine travelling to the non-engine travelling. The vehicle control unit 210 may determine the engine travelling time such that the engine travelling time is minimized to the extent that the hybrid vehicle can arrive at the destination only by the non-engine travelling after switching from the engine travelling to the non-engine travelling.

The vehicle control unit 210 may control the own vehicle to travel the entire scheduled travelling route by the non-engine travelling when the destination determining unit 202 judges that the own vehicle can arrive at the destination. The vehicle control unit 210 may control the own vehicle to travel the entire scheduled travelling route only by the non-engine travelling when the destination determining unit 202 judges that the own vehicle can arrive at the destination. The vehicle control unit 210 may determine the entire scheduled travelling route as the non-engine travelling section when the destination determining unit 202 judges that the own vehicle can arrive at the destination.

Note that the vehicle control unit 210 may cause the own vehicle to perform the engine travelling as necessary when the own vehicle is travelling a section determined as the non-engine travelling section by the non-engine travelling. For example, the vehicle control unit 210 is configured to cause the own vehicle to perform the engine travelling when a situation occurs in which a high output is required during travelling the non-engine travelling section.

In a case where the own vehicle includes a regenerative mechanism, even when the own vehicle is travelling the engine travelling section, when the travel driving power is on the regenerative side, the vehicle control unit 210 may stop the engine 112 and regenerate kinetic energy to the battery 120 by the regenerative mechanism. The regenerative mechanism may be a so-called regenerative braking. The regenerative mechanism may be a motor arranged in a drive shaft.

Figure 4:
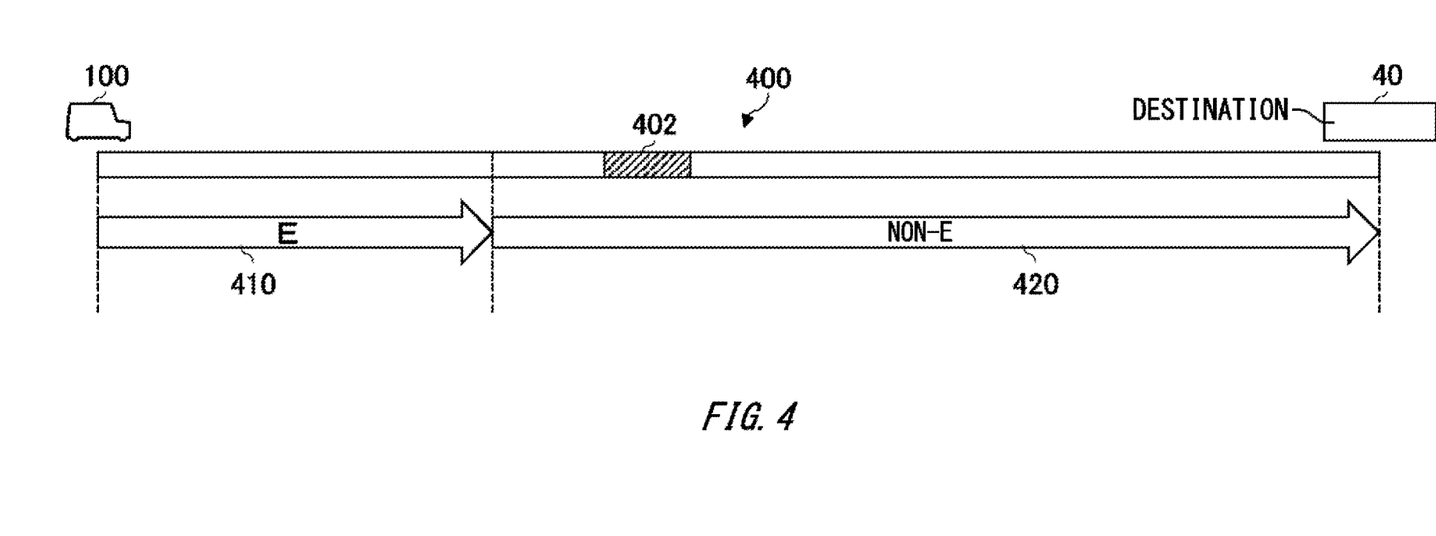
FIG. 4 is an illustration for explaining travelling control by a vehicle control unit 210.
Figure 5:
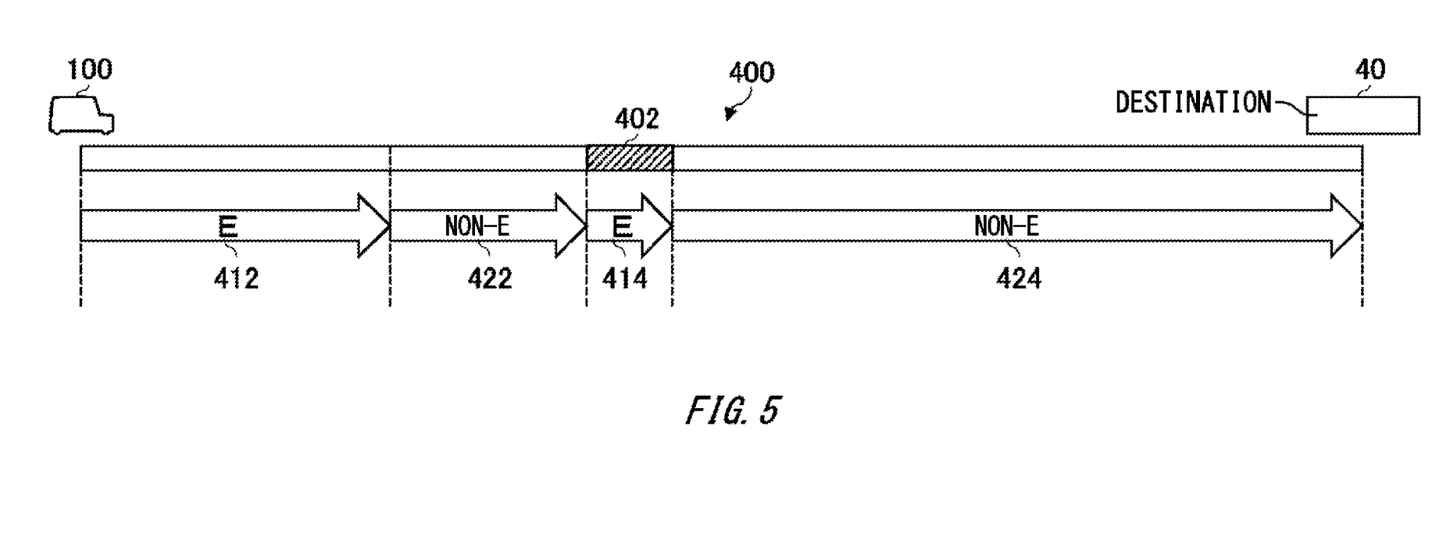
FIG. 5 is an illustration for explaining travelling control by the vehicle control unit 210.

FIG. 4 and FIG. 5 are illustrations for explaining travelling control by the vehicle control unit 210. FIG. 4 illustrates an engine travelling section 410 and a non-engine travelling section 420 determined without considering a road characteristic of a scheduled travelling route 400 to the destination 40 of the own vehicle. FIG. 5 illustrates an engine travelling section 412, an engine travelling section 414, a non-engine travelling section 422, and a non-engine travelling section 424 determined considering the road characteristic of the scheduled travelling route 400.

For example, the vehicle control unit 210 estimates an engine requiring section 402 in which the own vehicle needs to perform the engine travelling within the scheduled travelling route 400 based on the road characteristic of the scheduled travelling route 400. For example, the engine requiring section 402 is a section requiring a high output, such as an upward slope, a junction to a highway, or the like.

The vehicle control unit 210 may determine a section of the engine travelling before the non-engine travelling based on the engine requiring section 402. For example, the vehicle control unit 210 is configured to determine the engine travelling section 412 based on a heating volume of the battery 120 by the waste heat from the engine 112 when the own vehicle travels the engine requiring section 402. For example, the vehicle control unit 210 is configured to shorten the engine travelling section 412 compared to the engine travelling section 410, corresponding to a distance based on the heating volume.

In a case of the example shown in FIG. 4, the own vehicle can arrive at the destination 40 only by the non-engine travelling after travelling the engine travelling section 410, but will perform the engine travelling in the engine requiring section 402. Consequently the own vehicle will also consume fuel required to travel the engine requiring section 402 in addition to fuel required to travel the engine travelling section 410. In contrast, in a case of the example shown in FIG. 5, the engine travelling section 412 can be shortened, corresponding to a heating volume of the battery 120 by the waste heat from the engine 112 when the own vehicle travels the engine requiring section 402 by the engine travelling. As in the example shown in FIG. 4, this can shorten the engine travelling section compared to that in a case where the engine travelling section and the non-engine travelling section are determined without considering the road characteristic, and can suppress the fuel consumption of the tank 110.

Figure 6:
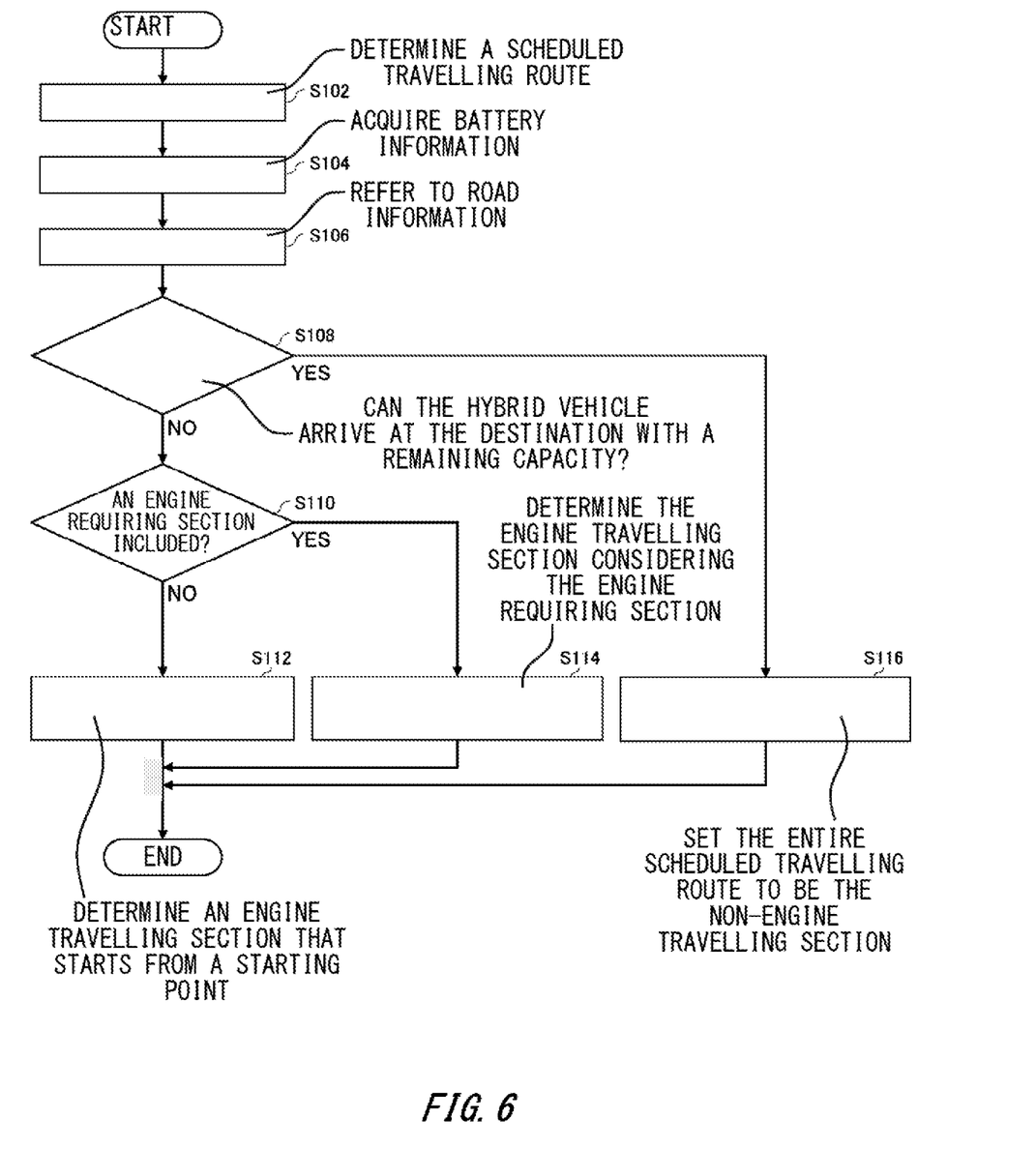
FIG. 6 schematically shows one example of a processing flow of the in-vehicle device 200.

FIG. 6 schematically shows one example of a processing flow of the in-vehicle device 200. Described here is the processing flow from a starting state to determination of the engine travelling section. In the starting state, the hybrid vehicle 100 is activated and a destination is set by an occupant of the hybrid vehicle 100 in a state where the engine 112 is not started.

At Step (Step may be abbreviated as S) 102, the arrival judging unit 208 determines a scheduled travelling route of the hybrid vehicle 100. At S104, the battery information acquiring unit 204 acquires battery information. At S106, the road information acquiring unit 206 refers to road information of the scheduled travelling route determined at S102.

At S108, the arrival judging unit 208 judges whether the hybrid vehicle 100 can arrive at the destination with a remaining capacity of the battery 120 based on the battery information and the road information. When the arrival judging unit 208 judges that the hybrid vehicle 100 cannot arrive at the destination, the process proceeds to S110, and, when the arrival judging unit 208 judges that the hybrid vehicle 100 can arrive at the destination, the process proceeds to S116.

At S110, the vehicle control unit 210 judges whether the scheduled travelling route includes an engine requiring section. When the vehicle control unit 210 judges that the scheduled travelling route includes no engine requiring section, the process proceeds to S112, and when the vehicle control unit 210 judges that the scheduled travelling route includes an engine requiring section, the process proceeds to S114.

At S112, the vehicle control unit 210 determines an engine travelling section that starts from a starting point. The vehicle control unit 210 may determine a shortest engine travelling section to the extent that the hybrid vehicle 100 can arrive at the destination only by the non-engine travelling after switching from the engine travelling to the non-engine travelling.

At S114, the vehicle control unit 210 determines the engine travelling section considering the engine requiring section. At S116, the vehicle control unit 210 set the entire scheduled travelling route to be the non-engine travelling section.

Figure 7:
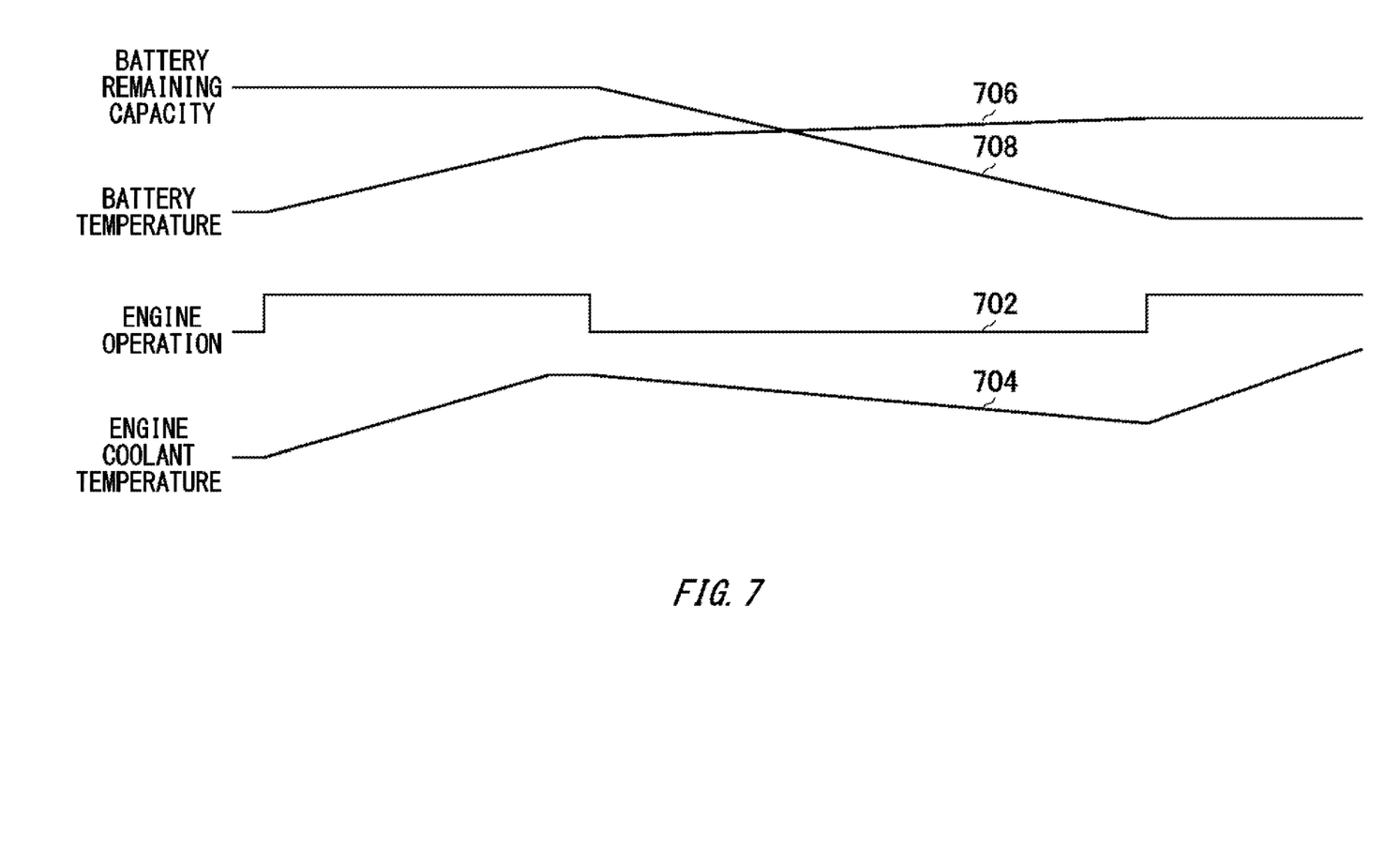
FIG. 7 schematically shows one example of a temperature change of a battery 120 in a case where the control by the in-vehicle device 200 is executed.
Figure 8:
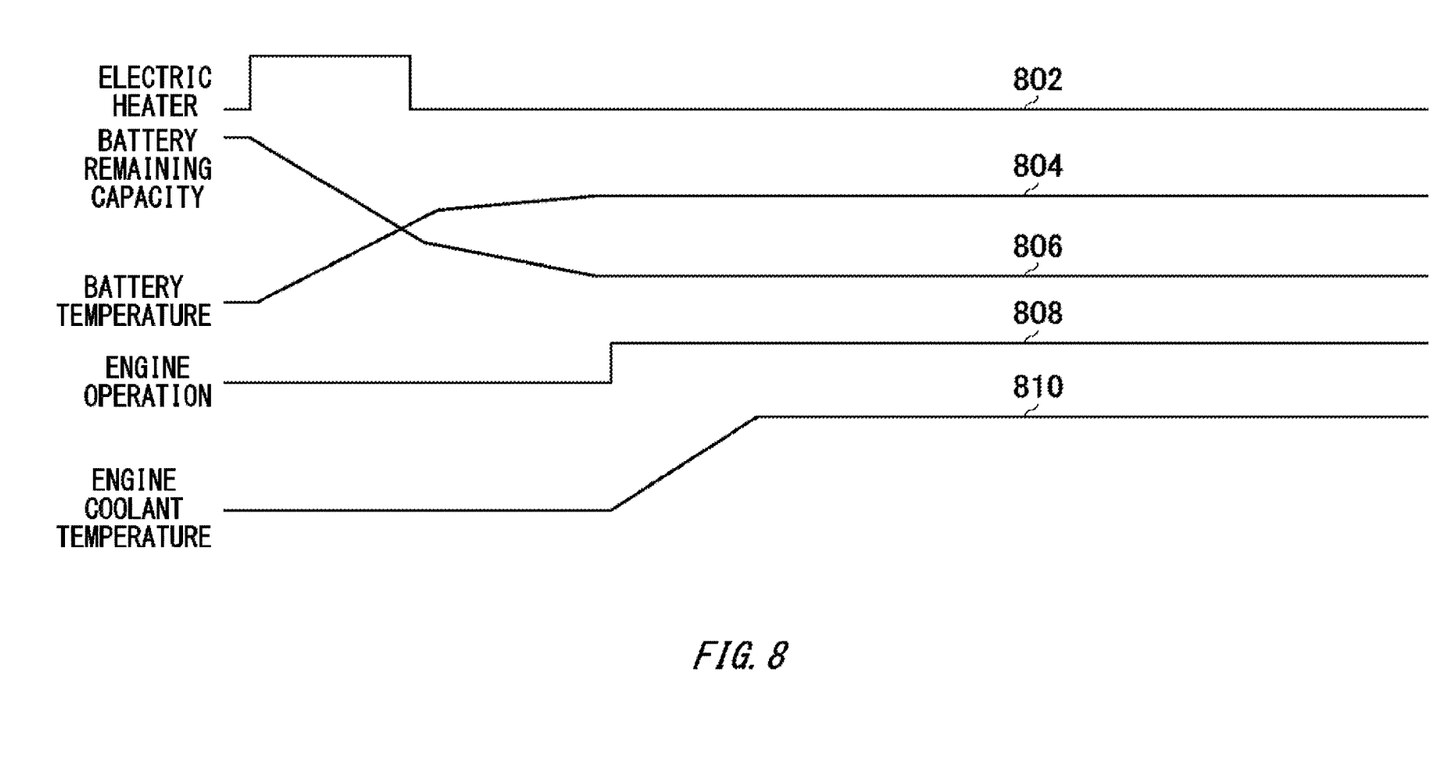
FIG. 8 schematically shows one example of a temperature change of a battery according to a prior art.

FIG. 7 schematically shows one example of a temperature change of a battery 120 in a case where the control by the in-vehicle device 200 is executed. FIG. 8 schematically shows one example of a temperature change of a battery according to a prior art. FIG. 8 shows one example of the temperature change of the battery according a prior art that uses an electric heater for heating the battery by using the electrical power of the battery.

With the control by the in-vehicle device 200 according to the present embodiment, as illustrated in FIG. 7, an engine operation 702 is firstly started, the engine travelling is performed, and then an engine coolant temperature 704 rises. As the engine coolant temperature 704 rises, a battery temperature 706 rises. Then, in a state in which the battery temperature 706 has become sufficiently high, the engine operation 702 is stopped, and the engine travelling switches to the non-engine travelling using the electrical power of the battery 120. During the non-engine travelling, the engine coolant temperature 704 is lowered and the battery remaining capacity 708 decreases.

With the control according to the prior art, the non-engine travelling using the electrical power of the battery is started and an electric heater operation 802 using the electrical power of the battery is started, thereby raising the battery temperature 804. At this time, the battery remaining capacity 806 significantly decreases. When an engine operation 808 is started in response to the decrease of the battery remaining capacity 806 and an engine coolant temperature 810 rises, but the waste heat from the engine will only be discarded.

As described above, according to the prior art, the electricity consumption is very poor because the non-engine travelling is performed using the electrical power of the battery while heating the battery with an electric heater using the electrical power of the battery. In addition, the waste heat from the engine will only be discarded. In contrast, the in-vehicle device 200 according to the present embodiment can reduce the need to operate the electric heater because the battery 120 is heated by the waste heat from the engine 112, and, for example, can reduce the cost of the hybrid vehicle 100 because the hybrid vehicle 100 does not include an electric heater. In addition, The electricity consumption can be improved because the non-engine travelling is performed using the electrical power of the battery 120 after heating of the battery 120 with the waste heat from the engine 112.

In FIG. 1 to FIG. 8, the in-vehicle device 200 is described as one example of the control device, but it is not limited thereto. The management server 300 may function as the control device.

Figure 9:
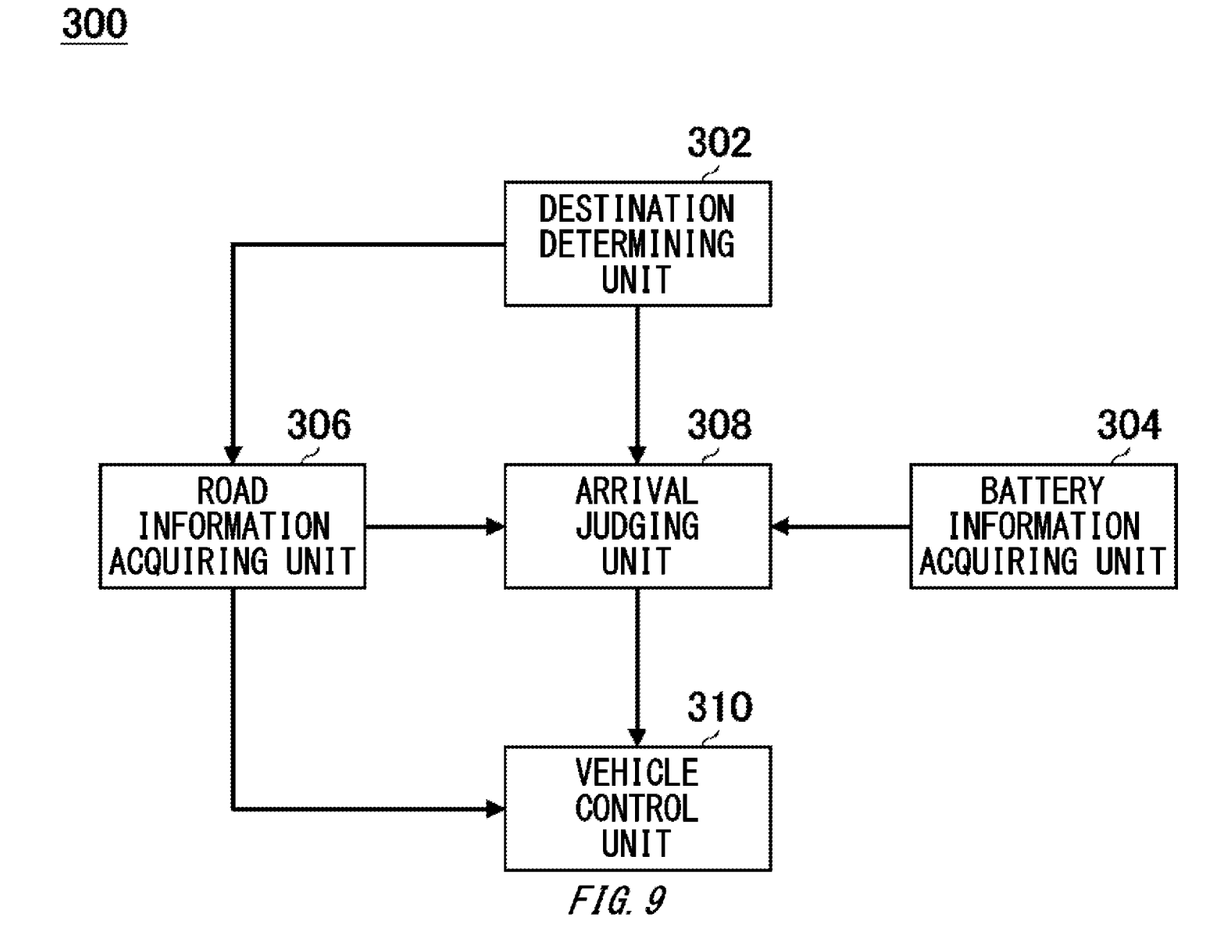
FIG. 9 schematically shows one example of a functional configuration of a management server 300.

FIG. 9 schematically shows one example of a functional configuration of the management server 300. The management server 300 includes a destination determining unit 302, a battery information acquiring unit 304, a road information acquiring unit 306, an arrival judging unit 308, and a vehicle control unit 310.

The destination determining unit 302 is configured to determine a destination of the hybrid vehicle 100 to be controlled (which may be described as the target vehicle). For example, the destination determining unit 302 is configured to determine the destination of the target vehicle by receiving information of the destination from the target vehicle.

The battery information acquiring unit 304 is configured to acquire battery information of the target vehicle. The battery information acquiring unit 304 may receive the battery information from the target vehicle.

The road information acquiring unit 306 is configured to acquire road information of a route to the destination determined by the destination determining unit 302. The road information acquiring unit 306 may acquire the road information of the route to the destination from road information stored therein in advance.

The arrival judging unit 308 is configured to determine a scheduled travelling route to the destination determined by the destination determining unit 302. The arrival judging unit 308 may perform a similar processing to that of the arrival judging unit 208.

The arrival judging unit 308 is configured to judge whether the target vehicle can arrive at the destination with the remaining capacity of the battery 120 based on the battery information acquired by the battery information acquiring unit 304 and the road information acquired by the road information acquiring unit 306. The arrival judging unit 308 may judge by a similar method to that of the arrival judging unit 208.

The vehicle control unit 310 may control the target vehicle by sending an instruction to the target vehicle. The vehicle control unit 310 is configured to control the target vehicle to start the engine 112 and supply waste heat from the engine 112 to the battery 120 when the arrival judging unit 308 judges that the target vehicle cannot arrive at the destination. The vehicle control unit 310 may perform a similar processing to that of the vehicle control unit 210.

Figure 10:
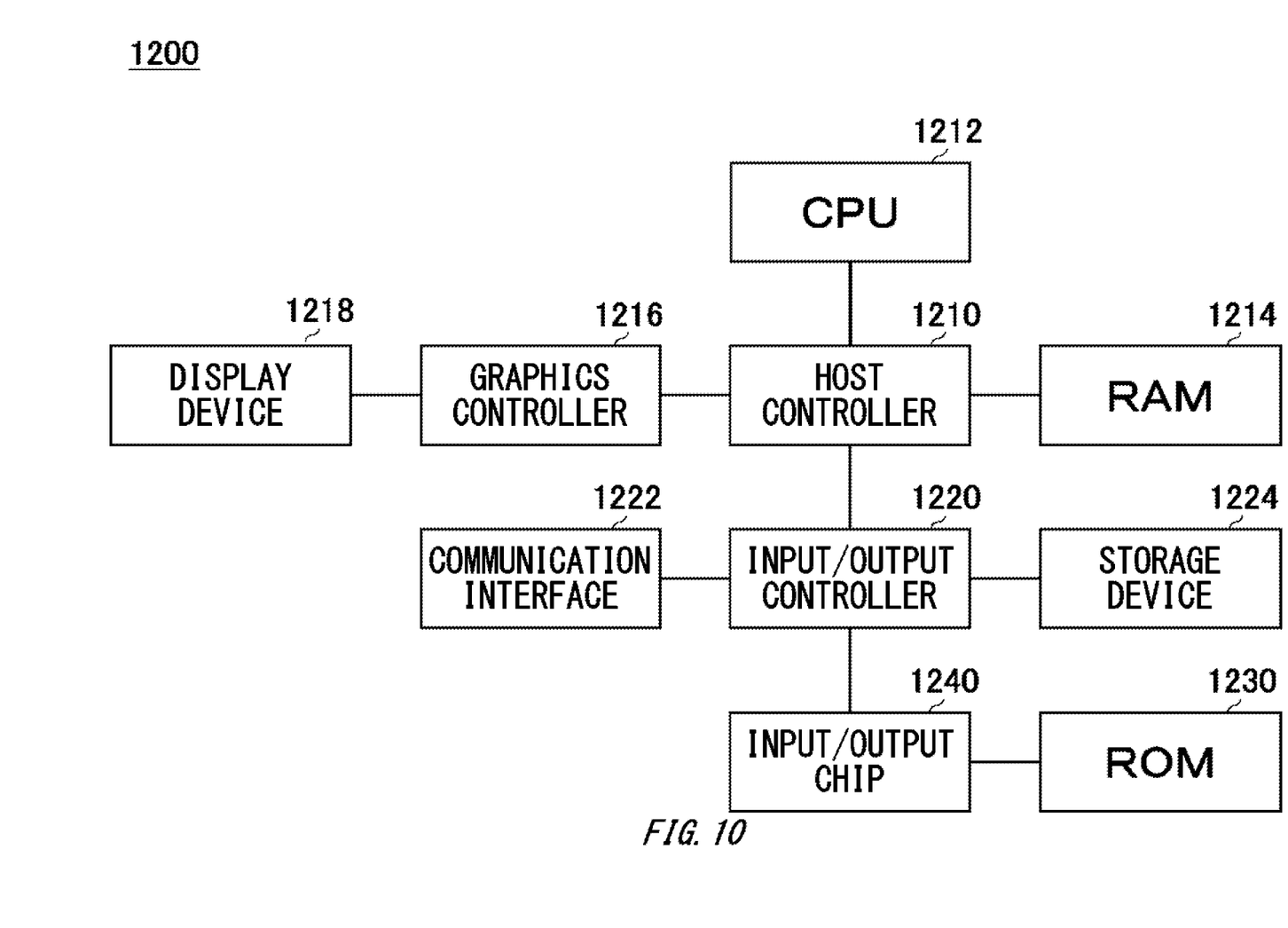
FIG. 10 schematically shows one example of a hardware configuration of a computer 1200 configured to function as the in-vehicle device 200 or the management server 300.

FIG. 10 schematically shows one example of a hardware configuration of a computer 1200 configured to function as the in-vehicle device 200 or the management server 300. A program that is installed in the computer 1200 can cause the computer 1200 to function as one or more "units" of apparatuses of the present embodiments or perform operations associated with the apparatuses of the present embodiments or the one or more units, and/or can cause the computer 1200 to perform processes of the present embodiments or steps thereof. Such a program may be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, and a graphics controller 1216, which are mutually connected by a host controller 1210. The computer 1200 also includes input/output units such as a communication interface 1222, a storage device 1224, a DVD drive and an IC card drive, which are connected to the host controller 1210 via an input/output controller 1220.

The DVD drive may be a DVD-ROM drive, a DVD-RAM drive, etc. The storage device 1224 may be a hard disk drive, a solid-state drive, etc. The computer 1200 also includes legacy input/output units such as a ROM 1230 and a keyboard, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on a display device 1218.

The communication interface 1222 communicates with other electronic devices via a network. The storage device 1224 stores programs and data used by the CPU 1212 within the computer 1200. The DVD drive reads the programs or the data from the DVD-ROM or the like, and provides the storage device 1224 with the programs or the data. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port or the like to the input/output controller 1220.

A program is provided by a computer readable storage medium such as the DVD-ROM or the IC card. The program is read from the computer readable storage medium, installed into the storage device 1224, RAM 1214, or ROM 1230, which are also examples of a computer readable storage medium, and executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffer region provided in a recording medium such as the RAM 1214, the storage device 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive (DVD-ROM), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, information processing, condition judging, conditional branch, unconditional branch, search/replacement of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry whose attribute value of the first attribute matches the condition a designated condition, from among the plurality of entries, and read the attribute value of the second attribute stored in the entry thereby obtaining the attribute value of the second attribute associated with the first attribute satisfying the predetermined condition.

The above described program or software modules may be stored in the computer readable storage medium on or near the computer 1200. In addition, a recording medium such as a hard disk or a RAM provided in a server system connected to a dedicated communication network or the Internet can be used as the computer readable storage medium, thereby providing the program to the computer 1200 via the network.

Blocks in flowcharts and block diagrams in the present embodiments may represent steps of processes in which operations are performed or "units" of apparatuses responsible for performing operations. Certain steps and "units" may be implemented by dedicated circuitry programmable circuitry supplied with computer readable instructions stored on a computer readable storage medium, and/or processors supplied with computer readable instructions stored on a computer readable storage medium. Dedicated circuitry may include digital and/or analog hardware circuits and may include integrated circuits (IC) and/or discrete circuits. For example, programmable circuitry may include reconfigurable hardware circuits including logical AND, OR, XOR, NAND, NOR, and other logical operations, flip-flops, registers, and memory elements, such as field-programmable gate arrays (FPGA), programmable logic arrays (PLA), etc.

A computer readable storage medium may include any tangible device that can store instructions for execution by a suitable device, such that the computer readable storage medium having instructions stored therein comprises an article of manufacture including instructions which can be executed to create means for performing operations specified in the flowcharts or block diagrams. Examples of the computer readable storage medium may include an electronic storage medium, a magnetic storage medium, an optical storage medium, an electromagnetic storage medium, a semiconductor storage medium, etc. More determine examples of the computer readable storage medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer readable instructions may be provided to a processor of a general purpose computer, special purpose computer, or other programmable data processing apparatus, or to programmable circuitry, locally or via a local area network (LAN), wide area network (WAN) such as the Internet, etc., so that the processor of the general purpose computer, special purpose computer, or other programmable data processing apparatus, or the programmable circuitry executes the computer readable instructions to create means for performing operations specified in the flowcharts or block diagrams. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations or improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system, 20: network, 100: hybrid vehicle, 110: tank, 112: engine, 120: battery, 122: motor, 130: heat exchanging unit, 200: in-vehicle device, 202: destination determining unit, 204: battery information acquiring unit, 206: road information acquiring unit, 208: arrival judging unit, 210: vehicle control unit, 300: management server, 302: destination determining unit, 304: battery information acquiring unit, 306: road information acquiring unit, 308: arrival judging unit, 310: vehicle control unit, 400: scheduled travelling route, 410, 412, 414: engine travelling section, 420, 422, 424: non-engine travelling section, 1200: computer, 1210: host controller, 1212: CPU, 1214: RAM, 1216: graphics controller, 1218: display device, 1220: input/output controller, 1222: communication interface, 1224: storage device, 1230: ROM, 1240: input/output chip

What is claimed is:

1. A control device comprising:
a destination determining unit configured to determine a destination of a hybrid vehicle that includes an engine, a motor and a battery and is able to supply waste heat from the engine to the battery;
an arrival judging unit configured to judge whether the hybrid vehicle can arrive at the destination with a remaining capacity of the battery based on the remaining capacity and a temperature of the battery; and
a vehicle control unit configured to control the hybrid vehicle to start the engine and supply the waste heat from the engine to the battery when the arrival judging unit judges that the hybrid vehicle cannot arrive at the destination.

2. The control device according to claim 1, wherein the vehicle control unit is configured to control the hybrid vehicle to perform a travelling in which electrical power generated by the engine is used or a travelling in which a drive shaft is rotated by power of the engine and supply the waste heat from the engine to the battery when the arrival judging unit judges that the hybrid vehicle cannot arrive at the destination.

3. The control device according to claim 1, wherein the vehicle control unit is configured to control the hybrid vehicle to perform an engine travelling in which the hybrid vehicle travels by operating the engine before a non-engine travelling in which the hybrid vehicle travels by the motor without operating the engine, when the arrival judging unit judges that the hybrid vehicle cannot arrive at the destination.

4. The control device according to claim 2, wherein the vehicle control unit is configured to control the hybrid vehicle to perform an engine travelling in which the hybrid vehicle travels by operating the engine before a non-engine travelling in which the hybrid vehicle travels by the motor without operating the engine, when the arrival judging unit judges that the hybrid vehicle cannot arrive at the destination.

5. The control device according to claim 3, wherein the vehicle control unit is configured to determine an engine travelling section including a section of the engine travelling before the non-engine travelling and a non-engine travelling section within a scheduled travelling route from a position of the hybrid vehicle to the destination, and control the hybrid vehicle to travel the engine travelling section by the engine travelling and travel the non-engine travelling section by the non-engine travelling, when the arrival judging unit judges that the hybrid vehicle cannot arrive at the destination.

6. The control device according to claim 5, wherein the vehicle control unit is configured to divide the scheduled travelling route into a plurality of sections, acquire vehicle velocity information in each section from a road information acquiring unit, and set a section to be the non-engine travelling section if the vehicle velocity information in the section is equal to or lower than a threshold.

7. The control device according to claim 5 wherein the vehicle control unit is configured to determine the engine travelling section and the non-engine travelling section such that the engine travelling section starts from a starting point of the hybrid vehicle.

8. The control device according to claim 6, wherein the vehicle control unit is configured to determine the engine travelling section and the non-engine travelling section such that the engine travelling section starts from a starting point of the hybrid vehicle.

9. The control device according to claim 5, wherein the vehicle control unit is configured to determine the engine travelling section and the non-engine travelling section by which the hybrid vehicle can arrive at the destination only by the non-engine travelling after switching from the engine travelling to the non-engine travelling.

10. The control device according to claim 6, wherein the vehicle control unit is configured to determine the engine travelling section and the non-engine travelling section by which the hybrid vehicle can arrive at the destination only by the non-engine travelling after switching from the engine travelling to the non-engine travelling.

11. The control device according to claim 7, wherein the vehicle control unit is configured to determine the engine travelling section and the non-engine travelling section by which the hybrid vehicle can arrive at the destination only by the non-engine travelling after switching from the engine travelling to the non-engine travelling.

12. The control device according to claim 5, wherein the vehicle control unit is configured to determine the engine travelling section and the non-engine travelling section by which the hybrid vehicle performs the engine travelling until the temperature of the battery becomes higher than a predetermined temperature by causing the hybrid vehicle to perform the engine travelling and supply the waste heat from the engine to the battery.

13. The control device according to claim 6, wherein the vehicle control unit is configured to determine the engine travelling section and the non-engine travelling section by which the hybrid vehicle performs the engine travelling until the temperature of the battery becomes higher than a predetermined temperature by causing the hybrid vehicle to perform the engine travelling and supply the waste heat from the engine to the battery.

14. The control device according to claim 5, wherein the vehicle control unit is configured to determine the engine travelling section and the non-engine travelling section based on a road characteristic of the scheduled travelling route.

15. The control device according to claim 14, wherein the vehicle control unit is configured to estimate an engine requiring section in which the hybrid vehicle needs to perform the engine travelling within the scheduled travelling route based on the road characteristic of the scheduled travelling route, and determine the section of the engine travelling before the non-engine travelling based on the engine requiring section.

16. The control device according to claim 15, wherein the vehicle control unit is configured to determine the section of the engine travelling to be performed before the non-engine travelling based on a heating volume of the battery by the waste heat from the engine when the hybrid vehicle travels the engine requiring section by the engine travelling.

17. The control device according to claim 1, wherein the arrival judging unit is configured to predict a temperature change of the battery when the hybrid vehicle travels by the non-engine travelling, and judge whether the hybrid vehicle can arrive at the destination by the non-engine travelling based on a prediction result.

18. The control device according to claim 1, wherein the vehicle control unit is configured to control the hybrid vehicle to travel a travelling route from a position of the hybrid vehicle to the destination only by the non-engine travelling when the arrival judging unit judges that the hybrid vehicle can arrive at the destination.

19. The control device according to claim 1, the vehicle control unit may determine a travelling time of the engine travelling to be performed before the non-engine travelling and control the hybrid vehicle to travel by the engine travelling during the travelling time, when the arrival judging unit judges that the hybrid vehicle cannot arrive at the destination.

20. A non-transitory computer readable storage medium having recorded thereon a program for causing a computer to function as:
- a destination determining unit configured to determine a destination of a hybrid vehicle that includes an engine, a motor and a battery and is able to supply waste heat from the engine to the battery;
- an arrival judging unit configured to judge whether the hybrid vehicle can arrive at the destination with a remaining capacity of the battery based on the remaining capacity and a temperature of the battery; and
- a vehicle control unit configured to control the hybrid vehicle to start the engine and supply the waste heat from the engine to the battery when the arrival judging unit judges that the hybrid vehicle cannot arrive at the destination.

* * * * *